(12) United States Patent
Audigie

(10) Patent No.: US 6,651,569 B2
(45) Date of Patent: Nov. 25, 2003

(54) SEED DRILL

(75) Inventor: Jean-Charles Audigie, Villeneuve la Guyard (FR)

(73) Assignee: Kuhn-Nodet S.A., Montereau (FR)

( * ) Notice: Subject to any disclaimer, the term of this patent is extended or adjusted under 35 U.S.C. 154(b) by 10 days.

(21) Appl. No.: 10/058,329

(22) Filed: Jan. 30, 2002

(65) Prior Publication Data

US 2002/0108546 A1 Aug. 15, 2002

(30) Foreign Application Priority Data

Feb. 12, 2001 (FR) .............................................. 01 02201

(51) Int. Cl.[7] ................................................. A01C 7/20
(52) U.S. Cl. ....................................................... 111/178
(58) Field of Search ........................ 56/10.2 R, 10.2 A, 56/10.2 K; 111/177, 178, 200, 170; 222/608, 609, 610, 271, 281, 278, 368

(56) References Cited

U.S. PATENT DOCUMENTS

| 1,957,459 A | * | 5/1934 | Strandlund | 111/67 |
| 3,704,459 A | * | 11/1972 | Young | 340/671 |
| 4,025,951 A | * | 5/1977 | Eckenbrecht | 348/548 |
| 4,811,001 A | * | 3/1989 | Sweany | 340/671 |
| 5,024,173 A | | 6/1991 | Deckler | |
| 6,240,861 B1 | * | 6/2001 | Memory | 111/178 |

FOREIGN PATENT DOCUMENTS

| DE | 36 02 074 A1 | 9/1986 |
| DE | 36 33 382 A1 | 4/1988 |

* cited by examiner

*Primary Examiner*—Robert E. Pezzuto
(74) *Attorney, Agent, or Firm*—Oblon, Spivak, McClelland, Maier & Neustadt, P.C.

(57) ABSTRACT

A seed drill comprising at least one metering device driven by a mechanism equipped with an input shaft, with a pinion and with a control handle. The seed drill is notable in that the control handle is connected in terms of rotation to the input shaft. The seed drill makes it easier to check the operation of the metering device.

17 Claims, 4 Drawing Sheets

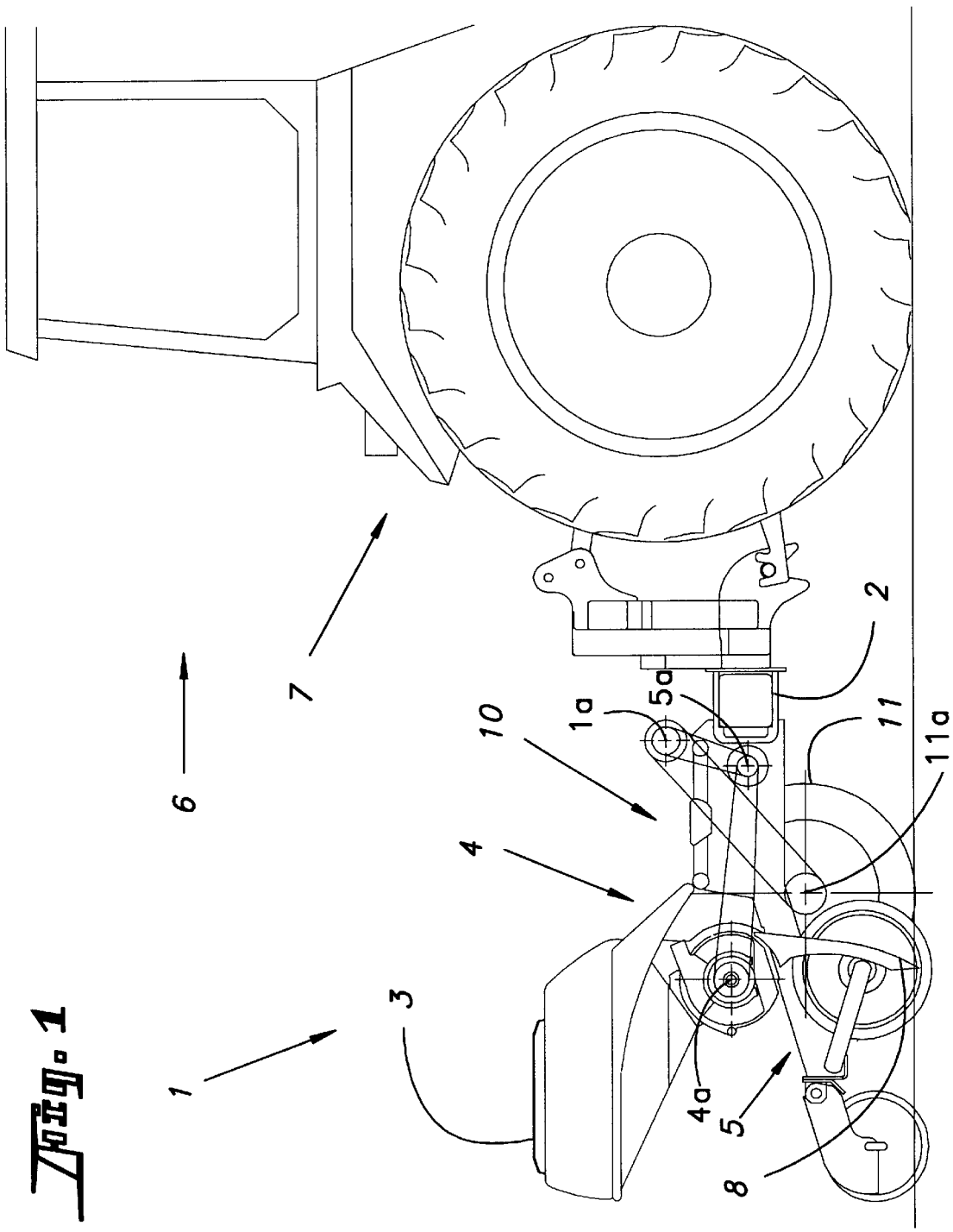

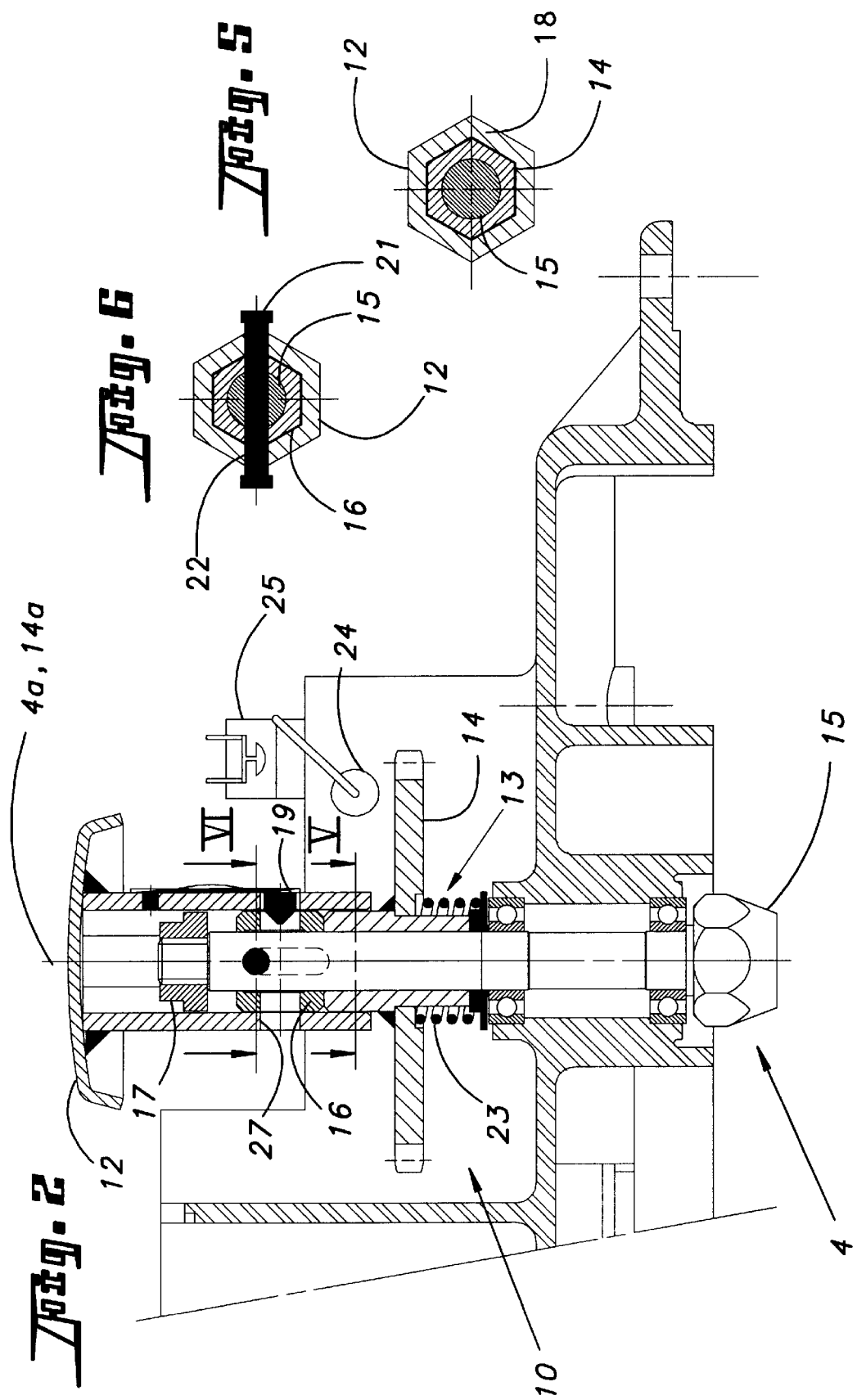

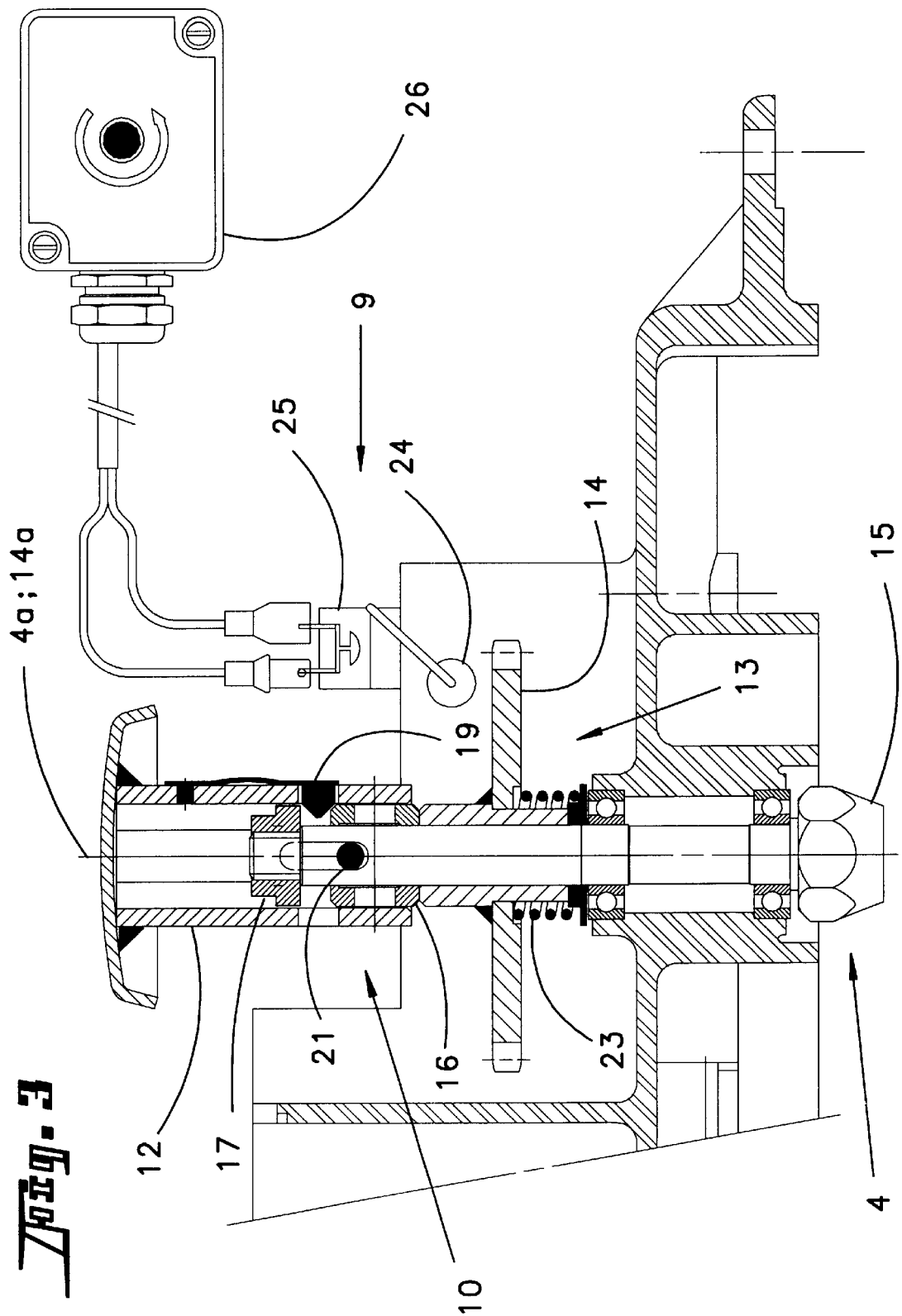

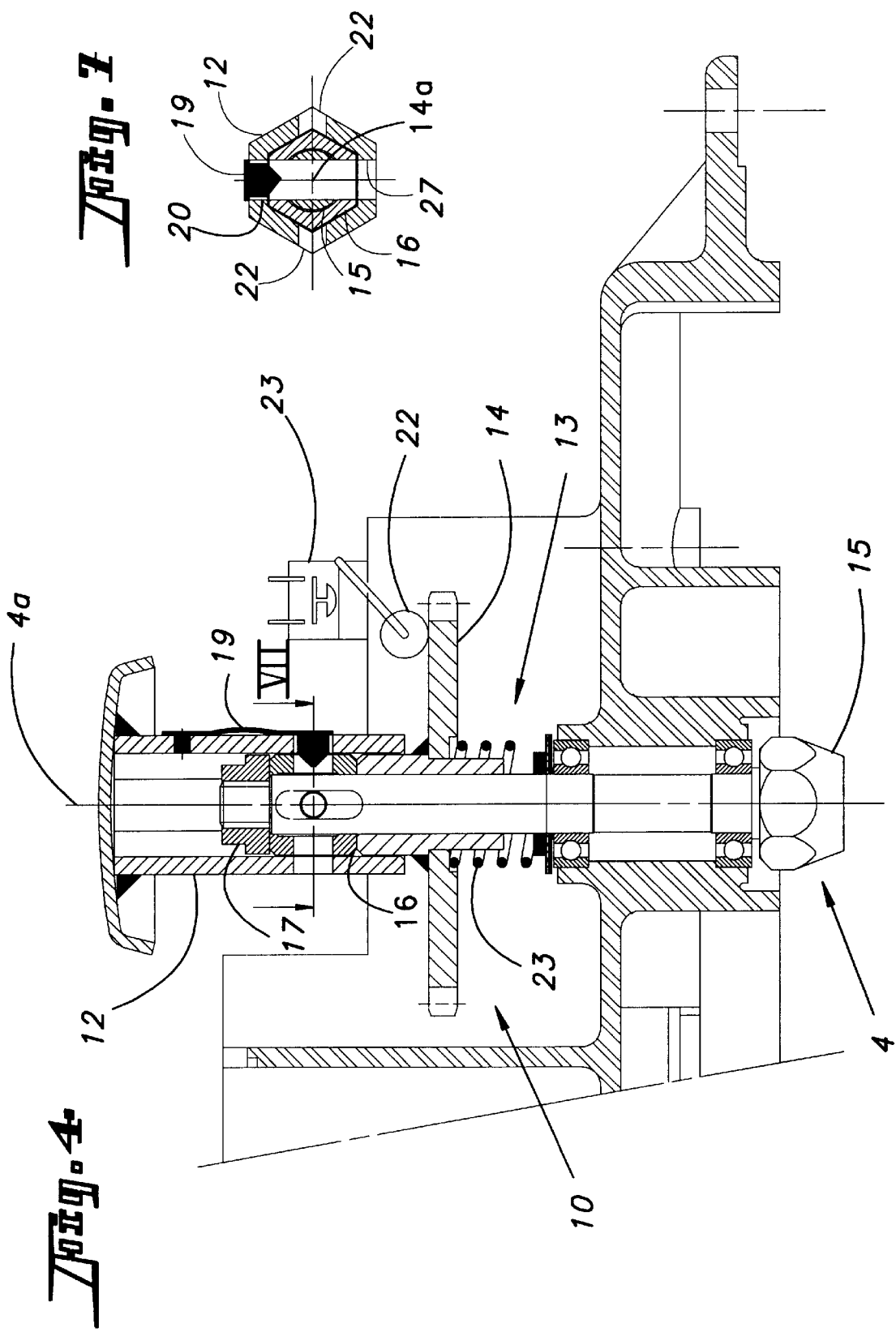

SEED DRILL

BACKGROUND OF THE INVENTION

1. Field of the Invention

The present invention relates to the overall technical field of agricultural machinery. It relates more specifically to a seed drill comprising at least one metering device driven by a mechanism equipped with an input shaft, with a pinion and with a control handle.

2. Discussion of the Background

Such a mechanism is known to those skilled in the art. Indeed, the Amazonen-Werke company manufactures and markets a precision planter (Amazone ED brochure). This known machine comprises a chassis supporting elements for planting seeds in the ground and a respective hopper for each planting element. Between the hopper and a seed-planting element there is a distribution element driven by a drive mechanism. This known machine also comprises drive wheels arranged forward of the planting elements. The axis of rotation of each wheel is substantially horizontal and substantially perpendicular to the direction of forward travel of the seed drill. During work, said wheels run along the ground and, via transmission elements, drive the metering elements. Thus the seed, initially contained in the hopper, is first of all metered then planted in the ground by the coulters. Each drive mechanism is equipped with a clutch handle allowing the drive of the seed distribution element to be engaged and disengaged. Each drive mechanism is additionally equipped with a shear pin intended to protect the distribution element from any overload.

What happens is that when the drive torque on a seeding element becomes too high, said shear pin breaks and there is no longer drive to the distribution element. Once said shear pin has been replaced and prior to continuing with sowing the user usually wishes to check that the cause of the incident has been removed. To this end, it is possible for him to drive the distribution element manually by maneuvering said drive wheels.

Now, this maneuver is relatively awkward. Indeed the user has first of all to disengage the drive of the distribution elements which he is not wishing to check. Then, having maneuvered said drive wheels, he has once again to engage said drive. Such seed drills therefore exhibit an obvious drawback.

SUMMARY OF THE INVENTION

It is an object of the present invention therefore to overcome this drawback of the state of the art.

According to the present invention, said seed drill is one wherein said control handle is connected in terms of rotation to said input shaft. Thus, with such a seed drill, the operation of the metering element can be checked far more easily.

BRIEF DESCRIPTION OF THE DRAWINGS

Other features of the invention, which are to be considered separately or in all feasible combinations thereof, will become apparent from the following description of a non-limiting exemplary embodiment of the invention which is depicted in the appended drawings in which:

FIG. 1 depicts a simplified side view, in the work position, of a precision seed drill according to the invention, FIG. 2 depicts a view in section on a different scale, of the drive mechanism with a control handle in the work position, FIG. 3 depicts a view in section of the drive mechanism of FIG. 2 in the disengaged position, FIG. 4 depicts a view in section of the drive mechanism of FIG. 2 in the safety position, FIG. 5 depicts a part section on V of FIG. 2, FIG. 6 depicts a part section on VI of FIG. 2, FIG. 7 depicts a part section on VII of FIG. 4.

DESCRIPTION OF THE PREFERRED EMBODIMENT

The seed drill 1 depicted in FIG. 1 comprises, in a way known to those skilled in the art, a chassis 2, at least one device for storing seeds 3, at least one metering device 4 and at least one planting element 5.

During work, said seed drill 1 is moved, in a direction and sense of forward travel indicated by the arrow 6, over ground that is to be sown. The seed, initially contained in said storage device 3 is conveyed to the planting element 5. The seed is then buried in said ground using the planting element 5. The metering device 4, for its part, allows precise control over the amount of seed deposited in the ground. For its part, said chassis 2 allows said seed drill 1 to be connected to a motor vehicle 7 depicted in part.

In the remainder of the description, the ideas of "front" and "rear", "in front of" and "behind" are defined with respect to the direction of forward travel 6, and the ideas of "right" and "left" are defined when viewing said seed drill 1 from the rear in said direction of forward travel 6.

In the exemplary embodiment depicted in FIG. 1, said seed drill 1 is of the "precision planter" type. To this end, said seed drill 1 comprises several seed planting elements 5. Said planting elements 5 are arranged at substantially uniform spacings across the entire width of said chassis 2. In a way known to those skilled in the art, each planting element 5 is connected to said chassis 2 and comprises a seed storage hopper 3, a metering device 4 and a spout 8. During work, each spout 8 digs a furrow in the ground and deposits seeds therein.

In a way known to those skilled in the art, each metering device 4 comprises a distribution disk (not depicted) equipped with cavities at regular intervals on a diameter. The distribution disk is driven in rotation about its axis 4a by means of a drive mechanism 10. Each cavity receives a seed and drives it in rotation about the axis 4a to the ejection opening where the seed drops under gravity into said spout 8 and then into the soil. To guarantee uniform metering, the rotational speed of said drive mechanism 10 is advantageously proportional to the speed of forward travel of said seed drill 1.

To this end, in the exemplary embodiment depicted, said drive mechanism 10 advantageously comprises two drive wheels 11. During work, said wheels 11 run along the ground about an axis 11a which is substantially horizontal and substantially transversal to said direction of forward travel 6. The rotational movement of said drive wheels 11 is transmitted to said metering device 4 in several stages. Specifically, said drive wheels 11 drive a primary spindle 1a of said seed drill 1. The direction of said primary spindle 1a is substantially parallel to said direction of the axis 11a of said wheels 11.

For its part, the primary spindle 1a transmits its rotational movement to a drive spindle 5a of said planting elements 5. The direction of said drive spindle 5a is substantially parallel to said direction of the primary spindle 1a. The spindle 5a for its part drives a pinion 14 by means of a chain (not depicted). Thus, said pinion 14 is driven in rotation about an axis 14a at a speed that is proportional to the speed of forward travel of said precision seed drill 1. The direction of said axis 14a is substantially parallel to said direction of the drive spindle 5a. Said axis 14a is advantageously coincident with the axis 4a of the distribution disk.

In the embodiment depicted in FIGS. 2 to 4, said drive mechanism 10 additionally comprises an input shaft 15 supporting said pinion 14, a central hub 16 and a mechanical safety device 13. Said distribution disk is connected to one end of said input shaft 15. The other end of said input shaft 15 supports a centering nut 17 capped by a control handle 12.

The control handle 12 has a complementary shape 18 matching the geometry of said pinion 14. Seen in FIG. 5, said complementary shape 18 is advantageously hexagonal. Said control handle 12 is indexed in the work position by means of a spring-loaded indexing peg 19. This is housed in an opening 20 formed, on one hand, in said control handle 12 and, on another hand, in said central hub 16. Said hexagonal shape 18 allows said control handle 12 to be driven by said pinion 14 about the axis 14a. The rotational movement of said control handle 12 is transmitted to the input shaft 15 via a safety element 21.

According to FIG. 6, the safety element 21 is housed in an orifice 22 passing through the following components: said control handle 12, said central hub 16 and the input shaft 15. The safety element 21 in combination with a compression spring 23 constitutes said mechanical safety device 13.

FIG. 4 depicts a safety position in which said mechanical safety device 13 is activated. What happens is that when the maximum permissible drive torque for the input shaft 15 has been exceeded, the safety element 21 breaks and the distribution disk is no longer driven by means of said control handle 12. The breakage of said safety element 21 allows said compression spring 23 to relax and to cause the translational movement, along the distribution axis 4a, of a set of components into abutment with said centering nut 17. This set of components is formed of the following components: said pinion 14, said central hub 16, said spring-loaded indexing peg 19 and said control handle 12. When the safety element 21 breaks, said control handle 12 advantageously positions itself in a safety position. During this translational movement, said pinion 14 immediately comes into contact with a roller 24. As said roller 24 is connected to an electric switch 25 the passage of electric current is immediately shut off. The electric switch 25 also sends a signal to a receiving unit 26. Said receiving unit 26 is preferably located in the cab of said motor vehicle 7 so as to trigger an alarm. Said roller 24, the electric switch 25 and said receiving unit 26 advantageously constitute a warning device 9. Said warning device 9 immediately informs the user of said seed drill 1 that there is a malfunction with said planting elements 5. The alarm is advantageously of the audible and/or visual type. This alarm allows the user to act immediately on the defective planting element 5 having identified it from the position of said control handle 12. Said control handle 12 is advantageously accessible and placed on the right-hand side of a planting element 5 and in a substantially horizontal plane, below said hopper 3.

The safety element 21 produced in the example depicted by means of a shear bolt 21 preferably breaks into three pieces. Two of them, at the ends, are ejected through the orifice 22. The third piece, situated in the middle and engaged in the input shaft 15, can be extracted from said drive mechanism 10 via a removal hole 27. Seen in FIG. 7, said removal hole 27 is preferably symmetric, with respect to said axis 14a, with said opening 20 that allows said control handle 12 to be indexed.

In this safety position, said control handle 12 remains indexed in said central hub 16 and will not be lost because of the incident that triggered the safety device. To return to a work position, all that is required is for said bolt 21 to be replaced, pushing on said control handle 12 to align the holes 22 in the following components: the input shaft 15, said control handle 12 and said central hub 16.

FIG. 3 depicts a position in which said control handle 12 is disengaged. In this position said spring-loaded indexing peg 19 is situated between said central hub 16 and the centering nut 17. Said control handle 12 is no longer driven by said pinion 14. For its part, said pinion 14 is still driven by said chain and rotates independently about said input shaft 15. In this configuration, said distribution disk can be driven manually by said control handle 12 via said bolt 21. Advantageously, when said control handle 12 has been disengaged, the user can thus check correct operation of the seed distribution disk. In this configuration, said pinion 14 does not come into contact with said roller 24. The electric switch 25 does not send warning information to said receiving unit 26.

The drive mechanism 10 and the precision seed drill 1 which have just been described are merely one exemplary embodiment and example of use which must not in any way restrict the field of protection defined by the claims which follow. Various modifications remain possible, particularly as regards the construction of the various elements or by substituting technical equivalents.

It is thus perfectly possible to use the drive mechanism 10 of the present invention on a seed drill.

What is claimed as new and desired to be secured by Letters Patent of the United States is:

1. A seed drill comprising:
   (a) at least one metering device; and
   (b) a drive mechanism for driving the at least one metering device, said drive mechanism equipped with an input shaft, a pinion, and a control handle, wherein said control handle is connected by a safety device to said input shaft, said safety device transmitting rotation of said control handle to said input shaft.

2. The seed drill as claimed in claim 1, wherein said control handle can occupy at least two positions with respect to said input shaft.

3. The seed drill as claimed in claim 2, wherein said control handle is indexed using an indexing peg.

4. The seed drill as claimed in claim 2, wherein, in at least one position, said control handle is driven by said pinion.

5. The seed drill as claimed in claim 2, wherein, in at least one position, said control handle is uncoupled from said pinion.

6. The seed drill as claimed in claim 1, wherein said seed drill is of the precision planter type.

7. The seed drill as claimed in claim 1, wherein said safety device is made up of a compression spring and of a safety element.

8. The seed drill as claimed in claim 7, wherein said safety element connects said control handle to said input shaft.

9. The seed drill as claimed in claim 7, wherein, said safety element is breakable and once said safety element has broken, said compression spring pushes said pinion and said control handle in translation along a longitudinal axis of said input shaft against a centering nut.

10. The seed drill as claimed in claim 7, wherein said safety element is a shear bolt.

11. The seed drill as claimed in claim 1, wherein said control handle has a shape that complements said pinion.

12. The seed drill as claimed in claim 11, wherein said complementary shape is hexagonal.

13. The seed drill as claimed in claim 1, wherein said drive mechanism comprises a warning device.

14. The seed drill as claimed in claim 1, wherein said a warning device comprises a roller, an electric switch and a receiving unit.

15. The seed drill as claimed in claim 14, wherein once a safety element has broken, said a compression spring pushes said pinion and said control handle in translation along a longitudinal axis of said input shaft against a centering nut, wherein an alarm is activated when said pinion is in contact with said roller.

16. The seed drill as claimed in claim 13, wherein the warning device is of the audible and visual type.

17. The seed drill as claimed in claim 13, wherein the warning device is of the audible or visual type.

* * * * *